US011924933B2

United States Patent

(12) United States Patent
Archer et al.
(10) Patent No.: US 11,924,933 B2
(45) Date of Patent: Mar. 5, 2024

(54) LIGHT DRIVER WITH IMPROVED DIMMING PROFILE

(71) Applicant: ERP POWER, LLC, Moorpark, CA (US)

(72) Inventors: Michael Archer, Moorpark, CA (US); Louis Chen, Simi Valley, CA (US); James H. Mohan, Valencia, CA (US)

(73) Assignee: ERP POWER, LLC, Westlake Village, CA (US)

( * ) Notice: Subject to any disclaimer, the term of this patent is extended or adjusted under 35 U.S.C. 154(b) by 0 days.

(21) Appl. No.: 18/052,107

(22) Filed: Nov. 2, 2022

(65) Prior Publication Data

US 2023/0292415 A1 Sep. 14, 2023

Related U.S. Application Data

(60) Provisional application No. 63/275,369, filed on Nov. 3, 2021.

(51) Int. Cl.

*H05B 45/10* (2020.01)
*H05B 45/325* (2020.01)
*H05B 45/355* (2020.01)

(52) U.S. Cl.

CPC ........... *H05B 45/10* (2020.01); *H05B 45/325* (2020.01); *H05B 45/355* (2020.01)

(58) Field of Classification Search

CPC ...... H05B 45/56; H05B 45/385; H05B 45/32; H05B 45/3725; H05B 45/375; H05B 45/18; H05B 45/10; H05B 45/31; H05B 45/325; H05B 45/355; H05B 45/382; H05B 47/10; H05B 45/102; H05B 41/3927; H05B 45/00; H05B 45/14; H05B 45/20; Y02B 20/30; H03K 5/05; H03K 5/1534; H03K 5/086; H02M 3/33507; H02M 1/08; H02M 1/12; H02M 1/4241; H02M 1/4258; H02M 3/22; H02M 5/257; H02M 1/0025; H02M 1/007; H02M 1/081; H02M 1/4225; H02M 3/158; H02M 1/44; H02M 1/0009; H02M 1/0012; H02M 1/0058; H02M 1/0064; H02M 1/083; H02M 1/126; H02M 1/36; H02M 1/4208; H02M 3/156; H02M 3/1582; H02M 3/33515; H02M 3/33523; H02M 3/33538; H02M 5/293

See application file for complete search history.

(56) References Cited

U.S. PATENT DOCUMENTS 8,736,191 B2 * 5/2014 Barrow .................. H05B 45/10 315/279
8,773,031 B2 * 7/2014 Sadwick .............. H05B 45/385 315/225

(Continued)

*Primary Examiner* — Monica C King
(74) *Attorney, Agent, or Firm* — Lewis Roca Rothgerber Christie LLP

(57) ABSTRACT

A light driver includes a pulse generator circuit configured to generate a pulsed signal based on a rectified input line voltage, a dimming detection circuit configured to determine whether phase-cut dimming is present at an input of the light driver based on the pulsed signal and to generate a phase-cut detection signal, and an input selection circuit configured to apply a first voltage or a second voltage to a reference input of a power factor correction (PFC) circuit of the light driver based on the phase-cut detection signal.

20 Claims, 2 Drawing Sheets

(56) References Cited

U.S. PATENT DOCUMENTS

| | | | | |
|---|---|---|---|---|
| 9,596,724 | B2 * | 3/2017 | Cohen | H05B 45/385 |
| 9,648,674 | B2 * | 5/2017 | Cohen | H05B 45/385 |
| 9,661,697 | B2 * | 5/2017 | Sadwick | H05B 45/18 |
| 9,980,330 | B2 * | 5/2018 | Cohen | G01R 19/0038 |
| 10,251,226 | B2 * | 4/2019 | Cohen | H05B 45/48 |
| 10,397,992 | B2 * | 8/2019 | Cohen | G01R 19/003 |
| 2011/0084623 | A1 * | 4/2011 | Barrow | H05B 45/10 315/250 |
| 2012/0299500 | A1 * | 11/2012 | Sadwick | H05B 45/385 315/224 |
| 2013/0193879 | A1 * | 8/2013 | Sadwick | H05B 45/385 315/307 |
| 2014/0265909 | A1 * | 9/2014 | Sadwick | H05B 45/32 315/224 |
| 2014/0265935 | A1 * | 9/2014 | Sadwick | H05B 45/56 315/307 |
| 2017/0223795 | A1 * | 8/2017 | Sadwick | H05B 45/18 |
| 2022/0086980 | A1 * | 3/2022 | Archer | H05B 45/24 |

* cited by examiner

LIGHT DRIVER WITH IMPROVED DIMMING PROFILE

CROSS-REFERENCE TO RELATED APPLICATION(S)

This application claims priority to, and the benefit of, U.S. Provisional Application No. 63/275,369 ("INJECTING DC VOLTAGE TO PFC CONTROLLER TO IMPROVE DIMMING PROFILE OF LED DRIVER"), filed on Nov. 3, 2021, the entire content of which is incorporated herein by reference.

FIELD

Aspects of the present disclosure are related to light emitting diode (LED) drivers.

BACKGROUND

A light emitting diode (LED) driver may include a power factor correction (PFC) circuit that serves to reduce the total harmonic distortion (THD) and increase the power factor (PF) of the LED driver. It may do so by comparing the sensed inductor current flowing through the switch-mode power supply of the LED driver with an internal sinusoidal reference curve derived from the rectified input voltage. However, when a phase-cut dimmer (e.g., a TRIAC dimmer) is used to dim the light produced by the LED driver, the PFC circuit fails to optimize THD and PF as the signal waveform at the input of the driver is no longer resembles a sinusoidal signal. Additionally, the PFC circuit also imposes a non-linear dimming curve on the LED driver that prevents the driver from dimming appropriately and may result in unwanted events, such as dimming to a minimum level before the dimming slider reaches the bottom of the track.

The above information disclosed in this Background section is only for enhancement of understanding of the disclosure, and therefore it may contain information that does not form the prior art that is already known to a person of ordinary skill in the art.

SUMMARY

Aspects of some embodiments of the present disclosure are directed to a light driver capable of maintaining a consistent dimming curve that is dictated by the secondary-side channel controller and not the primary-side PFC circuit. In some embodiments, the driver bypasses the current draw limits imposed by the reference input of the PFC Controller to prevent unwanted dimming characteristics. Additionally, the dimming curve of driver may remain consistent when operating the driver at alternate AC input voltages.

According to some embodiments, there is provided a light driver including: a pulse generator circuit configured to generate a pulsed signal based on a rectified input line voltage; a dimming detection circuit configured to determine whether phase-cut dimming is present at an input of the light driver based on the pulsed signal and to generate a phase-cut detection signal; and an input selection circuit configured to apply a first voltage or a second voltage to a reference input of a power factor correction (PFC) circuit of the light driver based on the phase-cut detection signal.

In some embodiments, the light driver further includes: a first voltage divider configured to generate an attenuated rectified voltage based on the rectified input line voltage, wherein the pulse generator circuit includes: a reference generator configured to generate a reference signal; and a first comparator configured to receive the reference signal and the attenuated rectified voltage, and to generate the pulsed signal based on a comparison of the reference signal and the attenuated rectified voltage.

In some embodiments, the light driver of claim 2, wherein the reference generator includes: a zener diode coupled to a negative input of the first comparator, and the reference signal is 2 V to 12 V.

In some embodiments, the first comparator includes: a first operational amplifier having a positive input terminal and a negative input terminal, and configured to receive the attenuated rectified voltage at the positive input terminal and the reference signal at the negative input terminal.

In some embodiments, the dimming detection circuit includes: a filter configured to low pass filter the pulsed signal and to produce a filtered signal; and a second comparator configured to receive the reference signal and the filtered signal and to produce the phase-cut detection signal, wherein a level of the phase-cut detection signal is indicative of a presence or absence of phase-cut dimming.

In some embodiments, the filter includes a passive low pass RC filter, and the filtered signal is a quasi-sawtooth signal.

In some embodiments, the second comparator includes: a second operational amplifier having a positive input terminal and a negative input terminal, and configured to receive the reference signal at the positive input terminal and the filtered signal at the negative input terminal.

In some embodiments, the pulsed signal is a pulse-width-modulated (PWM) signal having a duty cycle corresponding to a phase-cut of the rectified input line voltage.

In some embodiments, the pulse generator circuit is configured to transmit the pulsed signal to a channel controller of the light driver.

In some embodiments, the light driver of claim 1, further includes: the PFC circuit configured to reduce a total harmonic distortion (THD) of the light driver and to increase a power factor (PF) of the light driver.

In some embodiments, an input of the light driver is coupled to a phase-cut dimmer configured to perform phase-cutting of an input line voltage based on a dimmer setting.

In some embodiments, the light driver of claim 1, further includes: a rectifier configured to rectify an input line voltage to generate the rectified input line voltage; and a converter configured to convert the rectified input line voltage into a drive signal for powering a light source coupled to the light driver.

In some embodiments, an input line voltage from which the rectified input line voltage is generated is from 100 Vac to 277 Vac.

In some embodiments, the light driver further includes: a second voltage divider configured to generate the first voltage based on the rectified input line voltage; and a third voltage divider configured to generate the second voltage based on a PFC input voltage, wherein the input selection circuit includes: a switching circuit coupled to the second and third, voltage dividers and configured to apply one of the first voltage and the second voltage to the reference input of the PFC circuit based on the phase-cut detection signal.

In some embodiments, the switching circuit includes: a first switch configured to activate in response to the phase-cut detection signal being at a first level to apply the first voltage to the reference input of the PFC circuit, and to deactivate in response to the phase-cut detection signal being at a second level to decouple the reference input of the PFC circuit from the second voltage divider; and a second switch configured to deactivate in response to the phase-cut detection signal being at the first level to decouple the reference input of the PFC circuit from the third voltage divider, and to activate in response to the phase-cut detection signal being at the second level to apply the second voltage to the reference input of the PFC circuit.

In some embodiments, the PFC circuit is configured to deactivate a current limit and a dimming control function of the PFC circuit in response to receiving the second voltage at the reference input.

In some embodiments, the first switch includes a p-channel junction field effect transistor (JFET) and the second switch include an n-channel metal-oxide semiconductor field-effect transistor (MOSFET), each of the p-channel JFET and the n-channel MOSFET having a gate electrode coupled to an output of the input selection circuit.

In some embodiments, the first level is at a voltage lower than that of the second level, and the phase-cut detection signal being at the first level indicates absence of phase-cut dimming at an input of the light driver, and the phase-cut detection signal being at the second level indicates a presence of phase-cut dimming at the input of the light driver.

According to some embodiments, there is provided a lighting system including: a rectifier configured to receive a phase-cut input line voltage from a dimmer at an input of the rectifier and configured to generate a rectified input line voltage; and a light driver including: a power factor correction (PFC) circuit having a reference input and configured to a pulse generator circuit configured to generate a pulsed signal based on the rectified input line voltage; a dimming detection circuit configured to determine whether phase-cut dimming is present at an input of the light driver based on the pulsed signal and to generate a phase-cut detection signal; and an input selection circuit configured to apply a first voltage or a second voltage to a reference input of a power factor correction (PFC) circuit of the light driver based on the phase-cut detection signal.

In some embodiments, the PFC circuit is configured to deactivate a current limit and a dimming control function of the PFC circuit in response to receiving the second voltage at the reference input.

BRIEF DESCRIPTION OF THE DRAWINGS

The accompanying drawings, together with the specification, illustrate example embodiments of the present disclosure, and, together with the description, serve to explain the principles of the present disclosure.

DETAILED DESCRIPTION

The detailed description set forth below is intended as a description of example embodiments of light drivers, provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the spirit and scope of the disclosure. As denoted elsewhere herein, like element numbers are intended to indicate like elements or features.

Aspects of embodiments of the present disclosure are directed to a light driver that is configured to detect phase-cut dimming at its input (e.g., by a TRIAC dimmer) and to partially deactivate its power factor correction (PFC) circuit in response. Therefore, the internal reference curve derived from the reference input of the PFC circuit is no longer affected by the AC input voltage level applied to the driver. This allows the light driver to bypass the current draw limits imposed by the reference input of the PFC circuit to prevent unwanted dimming characteristics, and nullify the artificial dimming curve imposed by the PFC circuit. As a result, in the presence of phase-cut dimming, the driver is capable of maintaining a linear dimming curve that remains consistent even when operating the driver at alternate AC input voltages. In some embodiments, the injection of DC voltage is active only when phase-cut dimming is performed and the PFC circuit operates as intended when no phase-cut dimmer is attached or there is no phase-cut dimming.

Figure 1:
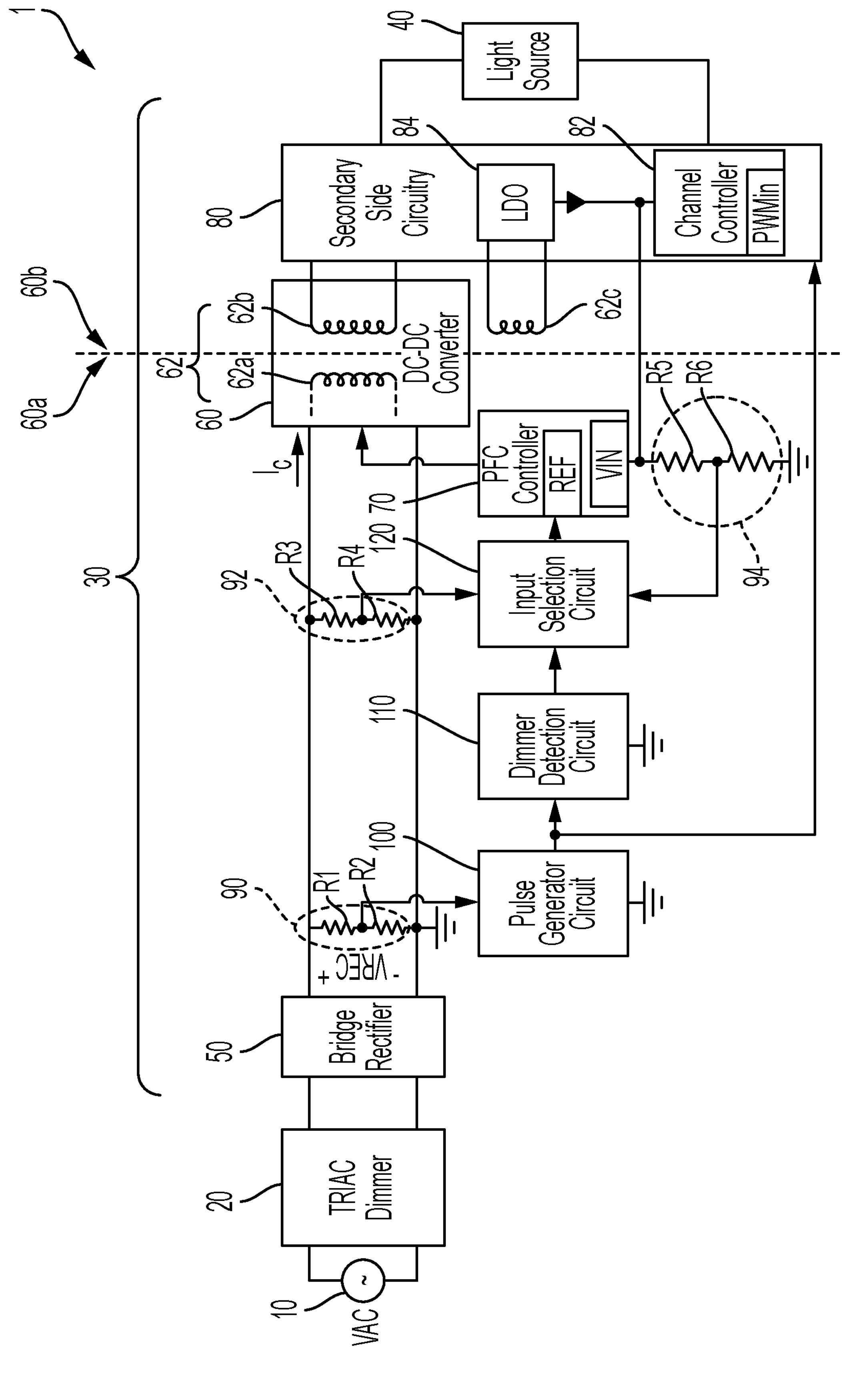
FIG. 1 illustrates a lighting system including a light driver coupled to a phase-cut dimmer, according to some example embodiments of the present disclosure.

FIG. 1 illustrates a lighting system including a light driver coupled to a phase-cut dimmer, according to some example embodiments of the present disclosure.

According to some embodiments, the lighting system 1 includes an input source 10, a dimmer 20, a light driver 30 (e.g., a switched-mode power supply) for powering and controlling the brightness of the light source 40 based on the signal from the input source 10.

The input source 10 may include an alternating current (AC) power source that may operate at a 100 Vac (e.g., in Japan), 120 Vac (e.g., in the US), a 240 Vac (e.g., in Europe), or 277 Vac (e.g., in large industrial plants). The dimmer 20 may include a phase-cut dimmer electrically powered by said AC power sources. The dimmer 20 may modify (e.g., cut/chop a portion of) the input AC signal according to a dimmer level before sending it to the light driver 30, and thus variably reduces the electrical power delivered to the light driver 30 and the light source 40. In some examples, the dimmer 20 may be a triode for alternating current (TRIAC) dimmer and may chop the front end or leading edge of the AC input signal. According to some examples, the dimmer interface may be a rocker interface, a tap interface, a slide interface, a rotary interface, or the like. A user may adjust the dimmer level by, for example, adjusting a position of a dimmer lever or a rotation of a rotary dimmer knob, or the like. The light source 40 may include one or more light-emitting-diodes (LEDs) or an arc or gas discharge lamp with electronic ballasts, such as high intensity discharge (HID) or fluorescent lights.

In some embodiments, the light driver 30 includes a rectifier 50, a converter (e.g., a DC-DC converter) 60, a power factor correction (PFC) circuit (e.g., a current-mode PFC controller) 70, and a secondary-side circuit 80. The rectifier 50 provides a same polarity of output for either polarity of the AC signal from the input source 10. In some examples, the rectifier 50 may be a full-wave circuit using a center-tapped transformer, a full-wave bridge circuit with four diodes, a half-wave bridge circuit, or a multi-phase rectifier.

The converter 60 converts the rectified AC signal generated by the rectifier 50 into a drive signal for powering and controlling the brightness of the light source 40. The drive signal may depend on the type of the one or more LEDs of the light source 40. For example, when the one or more LEDs of the light source 40 are constant current LEDs the drive signal may be a variable voltage signal, and when the light source 40 requires constant voltage, the drive signal may be a variable current signal. In some embodiments, the converter 60 includes a boost converter for maintaining (or attempting to maintain) a constant DC bus voltage on its output while drawing a current that is in phase with and at the same frequency as the line voltage (by virtue of the PFC circuit 70). A transformer 62 inside the converter 60 produces the desired output voltage from the DC bus. The converter 60 has a primary side 60*a* and a secondary side 60*b* that is electrically isolated from, and inductively coupled to, the primary side 60*a*. The primary and secondary sides 60*a* and 60*b* may correspond to the primary and secondary windings 62*a* and 62*b* of the transformer 62.

The secondary-side circuit 80 includes a channel controller 82 that controls the color intensity (as measured by lumens, Lm) of each of the color channels (e.g., red, blue, and green color channels) of the light source 40, thus enabling light dimming and adjusting the color mixing of the channels to produce a desired light output color. The channel controller 82 may also be part of a feedback loop for controlling the output power of the converter 60. The secondary-side circuit 80 may also include a linear regulator (e.g., a low dropout regulator (LDO)) 84 that is coupled to, and received power from, a secondary winding 62*c* of the converter 60 and produces a bias voltage that may be used to power the various circuits of the secondary-side circuit 80 (such as the channel controller 82).

PFC circuit 70 improves (e.g., increases) the power factor of the load on the input source 10 and reduces the total harmonic distortions (THD) of the light driver 30. As non-linear loads including the rectifier 50 and the converter 60 distort the current drawn from the input source 10, the PFC circuit 70 counteracts the distortion and raises the power factor. In some examples, other sources of current distortion may be input filter capacitors, input filter chokes, boost inductor, second stage transformer, and any non-linear elements or loads on the secondary side of a transformer 62 inside the converter 60, which would be reflected over to the primary side of the transformer 62. Further, the main switch (e.g., transistor) in the PFC/boost stage of the converter 60 may also distort the current if it is fed with a constant duty cycle or constant on time. The PFC circuit 70 is capable of counteracting current distortions regardless of the source.

In the absence of a phase-cut dimming by the dimmer 20, the PFC circuit 70 controls the converter 60 to ensure that the input current $I_C$ to the converter 60 matches the waveform of the rectified input line voltage $V_{REC}$ generated by the rectifier 50. In so doing, the PFC circuit 70 senses a current $I_C$ flowing through an inductor of the converter 60 (e.g., the inductor of the boost circuit), and compares this sensed current against the rectified input voltage $V_{REC}$. Based on this comparison, the PFC circuit 70 generates a control signal that controls the on-off timing of a switching element in the converter 60 (e.g., the inductor of the boost circuit), which determines the shape of the input current waveform at the converter 60.

In the presence of phase-cut dimming (e.g., by a TRIAC dimmer), the PFC circuit 70 may not be capable of optimizing PF and THD due to the fact that a portion of the waveform of the input line voltage VAC is chopped and it no longer resembles a sinusoidal signal. Thus, the PFC circuit 70 fails to perform its primary function. However, the undesirable effects of the PFC circuit 70 may persist.

For example, the dimming curve that the driver 30 follows is affected by the amount of inductor current that the driver can draw (which is substantially the same as the output current of the driver 30). In cases when the driver is operating at alternate input voltages, for example when driving at 277 Vac versus 120 Vac, the sinusoidal reference that is internally derived from the signal at the reference input of the PFC circuit 70 would be higher and the inductor current that can be drawn may be higher as well. Thus, the peak inductor current is limited by the internal sinusoidal reference derived from the rectified input line voltage.

Further, the reference curve of the PFC circuit 70 adds an additional limiting factor to the driver 30, which may also affect dimming. The non-linear dimming curve imposed by the PFC circuit 70 may not allow the driver 30 to dim appropriately and could result in unwanted events, such as dimming to a minimum level before the dimming slider reaches the bottom of the track.

Thus, according to some embodiments, the light driver 30 detects when phase-cut dimming is performed by the dimmer 20 (e.g., the TRIAC dimmer) at the input of the driver 30 and partially deactivates the PFC circuit 70 in response. In some embodiments, the light driver 30 includes a pulse generator circuit 100, a dimming detection circuit 110, and an input selection circuit 120, which together operate to detect the presence of the phase-cut dimming by the dimmer 20 and to deactivate the current limiting function and dimmer controls of PFC circuit 70 in response. In some embodiments, the input selection circuit 120 effectively deactivates the PFC circuit 70 by injecting a regulated voltage (e.g., a constant DC voltage) into the reference input REF of the PFC circuit 70, which raises the limit that the peak inductor current can reach. Thus, the maximum peak current that the inductor of the converter 60 can draw (which corresponds to the driver's output current) is no longer limited by the internal sinusoidal reference derived from the signal at the reference input REF. As a result, the channel controller 82 can dictate all dimming control of the driver 30 without limitations from the PFC circuit 70, which allows for more consistent dimming even across a wide range of input voltages (e.g., from 108 Vac to 277 Vac).

In some embodiments, the pulse generator circuit 100 is coupled to the output of the rectifier 50 through a first voltage divider 90 with first and second resistors R1 and R2 that attenuates the rectified input line voltage $V_{REC}$ to produce a rectified signal, which the pulse generator circuit 100 utilizes to generate a pulsed signal (e.g., a pulse-width-modulated (PWM) signal) that corresponds to the signal received by the rectifier 50, which may be a chopped waveform from the dimmer 20. Thus, the pulsed signal is indicative of the light dimming level (e.g., the dimming level set by a user via the phase-cut dimmer 20). As such, in addition to providing the pulsed signal to the dimming detection circuit 110, the pulse generator circuit 100 provides this signal to the PWM input of the channel controller 82 so that the controller 82 may determine the dimming level set by a user at the phase-cut dimmer 20 and adjust the light output intensity of the light source 40 accordingly.

The dimming detection circuit 110 is configured to determine whether a phase-cut dimmer 20 is performing dimming at the input of the driver 30 based on the pulsed signal and to generate a phase-cut detection signal, the level of which indicates whether phase-cut dimming is present or not.

The input selection circuit 120 is configured to apply a first voltage or a second voltage to a reference input REF of the PFC circuit 70 depending on the level of the phase-cut detection signal from the dimming detection circuit 110. The first voltage may be a second attenuated rectified voltage derived from the rectified input line voltage $V_{REC}$ by a second voltage divider 92 with third and fourth resistors R3 and R4 coupled to the output of the rectifier 50. When phase-cut dimming is being performed, the first voltage may have a chopped waveform corresponding to that of the rectified input line voltage $V_{REC}$. The second voltage may be an attenuated regulated voltage (e.g., a DC voltage) generated by a third voltage divider 94 with fifth and sixth resistors R5 and R6 coupled to the secondary side circuit 80 of the light driver 30. When the PFC circuit 70 observes a regulated (e.g., DC) voltage at its reference input REF it seizes PF and THD correction and effectively deactivates as its current limiting and dimming control functions are nullified.

In some embodiments, when phase-cut dimming is not being performed and the corresponding phase-cut detection signal is at a first level, the input selection circuit 120 couples the first voltage to the reference input of the PFC circuit 70, which allows the PFC circuit 70 to operate normally and attempt to improve (e.g., optimize) PF and THD of the driver 30. In the presence of phase-cut dimming by the dimmer 20, the corresponding phase-cut detection signal is at a second level, which causes the input selection circuit 120 to couple the second voltage to the reference input of the PFC circuit 70. This leads to deactivation of the current limiting and dimming control functions of the PFC circuit 70.

Figure 2:
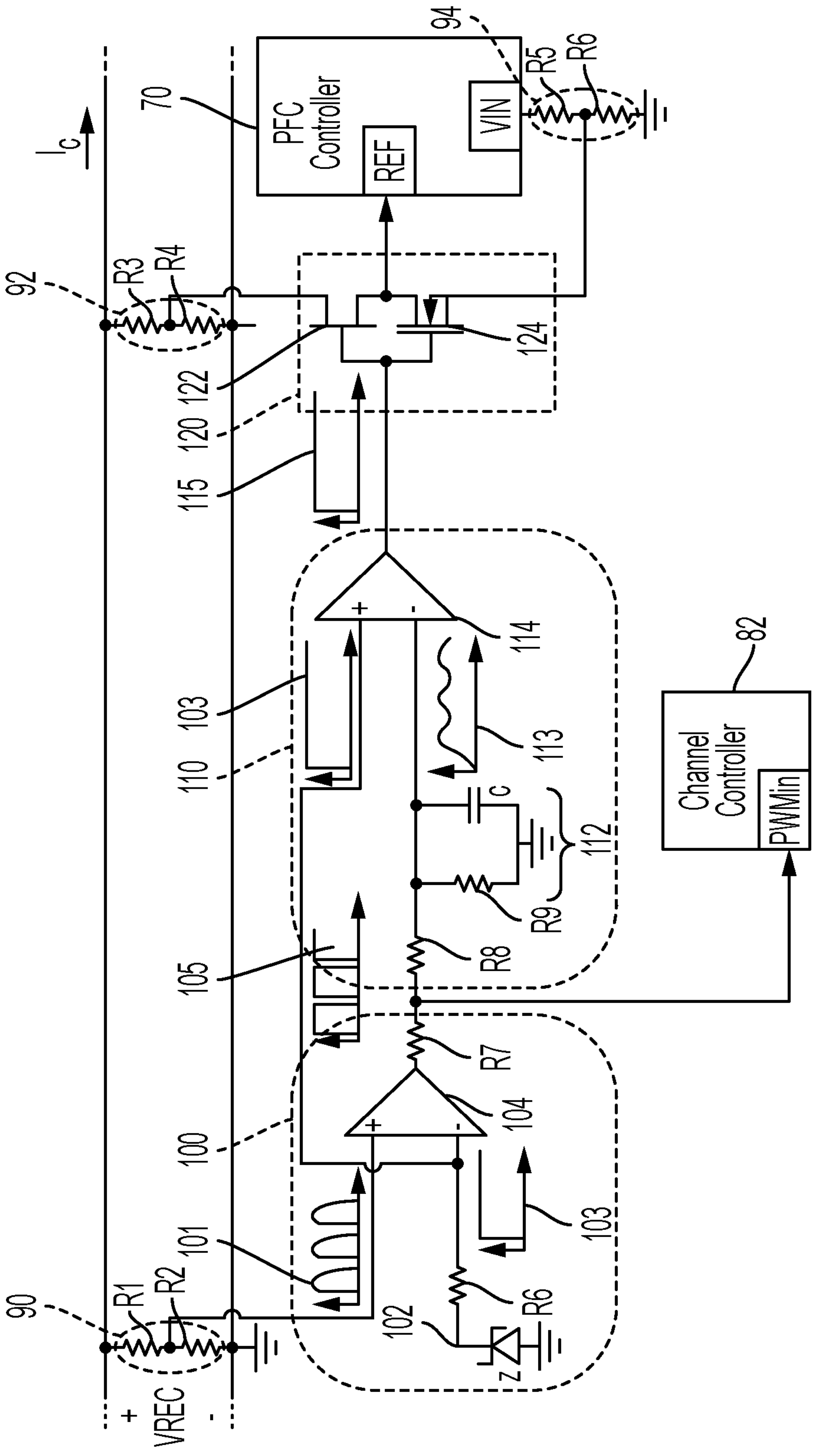
FIG. 2 illustrates a schematic view of a pulse generator circuit, a dimming detection circuit, and an input selection circuit of the light driver, according to some example embodiments of the present disclosure.

FIG. 2 illustrates a schematic view of the pulse generator circuit 100, the dimming detection circuit 110, and the input selection circuit 120, according to some example embodiments of the present disclosure.

In some embodiments, the pulse generator circuit 100 includes a reference generator 102 that is configured to generate a reference signal (e.g., a constant voltage) 103, and a first comparator 104 that is configured to receive the reference signal 103 and the attenuated rectified voltage 101 from the first voltage divider 90, and to generate the pulsed signal 105 based on a comparison of the reference signal 103 and the attenuated rectified voltage 101.

In some examples, the reference generator 102 may include a zener diode Z that is biased to generate a constant zener reference voltage that may be about 2 V to 12 V. The zener diode Z may be biased via a secondary winding of the converter 60, or through any other suitable source. For example, the zener diode Z may be biased through the bias voltage produced by the linear regulator 84.

The first comparator 104 may include a first operational amplifier having a positive input terminal that is configured to receive the first reduced rectified voltage, and a negative input terminal coupled to the reference generator (e.g., to the cathode of the zener diode Z) and configured to receive the reference signal 103. The pulsed signal 105 generated by the first comparator 104 may be a pulse-width-modulated (PWM) signal having a duty cycle that corresponds to a phase-cut of rectified input line voltage $V_{REC}$ and thus indicates the dimming level at the dimmer 20. For example, a duty cycle less than 100% indicates the presence of dimming. The first comparator 104 may transmit this PWM signal to the dimming detection circuit 110 as well as the channel controller 82.

According to some embodiments, the dimming detection circuit 110 includes a filter (e.g., a low pass filter) 112 that is configured to low pass filter the pulsed signal 105 and to produce a filtered signal 113, which may be a quasi-sawtooth signal. In some examples, the filter 112 may be a passive low pass RC filter with resistors R8 and R9 and capacitor C, and the filtered signal may be a quasi-sawtooth signal. The dimming detection circuit 110 further includes a second comparator 114 that is configured to receive the reference signal 103 and the filtered signal 113 and to produce the phase-cut detection signal 115, the level of which is indicative of a presence or absence of the phase-cut dimming. The second comparator 114 may include a second operational amplifier having a positive input terminal configured to receive the reference signal 103 from the reference generator 102, and a negative input terminal coupled to the filter 112 and configured to receive the filtered signal 113.

The first and second comparators 104 and 114 may be electrically powered by a secondary winding of the converter 60, or through any other suitable source. For example, the first and second comparators 104 and 114 may be biased through the bias voltage produced by the linear regulator 84.

In some embodiments, the voltage of the reference signal 103 may be set such that if any portion of the input line voltage is chopped, the filtered signal 113 falls below the reference voltage 103 causing the second comparator 114 to generate a high-level signal (a "second level") and if the signal is not chopped at all (e.g., if there is no phase-cut dimming), then the filtered signal 113 exceeds the reference voltage 103 causing the second comparator 114 to generate a low-level signal (a "first level"). Thus, the dimming detection circuit 110 generates a binary output (i.e., phase-cut detection signal) indicating whether the input AC signal is being chopped by a phase-cut dimmer or not.

The input selection circuit 120 includes a switching circuit that is coupled to the second and third voltage dividers 92 and 94 and is configured to apply one of the first voltage and the second voltage to the reference input REF of the PFC circuit 70 based on the phase-cut detection signal. The switching circuit includes a first switch 122 and a second switch 124, the gates of which are connected to the output of the second comparator 114. At any given point, one of the first switch 122 and the second switch 124 is activated while the other is deactivated, thus ensuring that the PFC circuit 70 receives either the first voltage or the second voltage. In some examples, the first switch 122 includes a p-channel junction field effect transistor (JFET) and the second switch 124 includes an n-channel metal oxide field effect transistor (MOSFET), the drains of which may be coupled together and to the reference input REF of the PFC circuit 70. However, embodiments of the present disclosure are not limited to the use of such transistors, and any suitable transistors may be used as the first and second switches 122 and 124. For example, the first switch 122 may be a p-channel MOSFET.

In some embodiments, the first switch 122 is configured to activate in response to the phase-cut detection signal being at a first level (e.g., a low voltage level) to apply the first voltage from the second voltage divider 92 to the reference input REF of the PFC circuit 70, and to deactivate in response to the phase-cut detection signal being at a second level (e.g., a high voltage level) to decouple the reference input REF of the PFC circuit 70 from the second voltage divider 92. The second switch 124 is configured to deactivate in response to the phase-cut detection signal being at the first level (e.g., a low voltage level) to decouple the reference input REF of the PFC circuit 70 from the third voltage divider 94, and to activate in response to the phase-cut detection signal being at the second level (e.g., a high voltage level) to apply the second voltage (e.g., a DC voltage) from the third voltage divider 94 to the reference input REF of the PFC circuit 70.

Applying the DC signal to the PFC circuit 70 effectively nullifies the ability of this circuit to regulate output power of the light driver 30 (i.e., the voltage at the reference input REF seizes to be a limiting factor) and the output of the light driver 30 relies on the closed loop feedback that is provided by the channel controller 82.

Deactivating the current limit and dimming control functions of the PFC circuit 70 also leads to the elimination of the non-linear dimming curve dictated by the PFC circuit 70. Generally, when the dimmer setting changes, the light output of the driver does not linearly track the dimmer setting and instead follows the non-linear curve (e.g., logarithmic curve) imposed by the PFC block. This non-linear curve is affected by the input line voltage VAC (e.g., 108 Vac or 120 Vac, etc.) and also by the amount of inductor current the driver can draw (i.e., the maximum driver output current). By effectively deactivating the PFC circuit 70 when there is phase-cut dimming (e.g., by a TRIAC dimmer), the non-linear dimming curve is eliminated and the dimming curve becomes linear and the light output linearly tracks the dimmer setting, which may be desired. Also, dimming profile of the driver 30 becomes consistent even when operating the driver at alternate AC input voltages It will be understood that, although the terms "first", "second", "third", etc., may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section, without departing from the spirit and scope of the inventive concept.

The terminology used herein is for the purpose of describing particular embodiments and is not intended to be limiting of the inventive concept. As used herein, the singular forms "a" and "an" are intended to include the plural forms as well, unless the context clearly indicates otherwise. It will be further understood that the terms "include", "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of", when preceding a list of elements, modify the entire list of elements and do not modify the individual elements of the list. Further, the use of "may" when describing embodiments of the inventive concept refers to "one or more embodiments of the inventive concept". Also, the term "exemplary" is intended to refer to an example or illustration.

It will be understood that when an element or layer is referred to as being "on", "connected to", "coupled to", or "adjacent" another element or layer, it can be directly on, connected to, coupled to, or adjacent the other element or layer, or one or more intervening elements or layers may be present. When an element or layer is referred to as being "directly on," "directly connected to", "directly coupled to", or "immediately adjacent" another element or layer, there are no intervening elements or layers present.

As used herein, the terms "substantially", "about", and similar terms are used as terms of approximation and not as terms of degree, and are intended to account for the inherent variations in measured or calculated values that would be recognized by those of ordinary skill in the art.

As used herein, the terms "use", "using", and "used" may be considered synonymous with the terms "utilize", "utilizing", and "utilized", respectively.

The LED driver and/or any other relevant devices or components according to embodiments of the present disclosure described herein may be implemented by utilizing any suitable hardware, firmware (e.g., an application-specific integrated circuit), software, or a suitable combination of software, firmware, and hardware. For example, the various components of the LED driver may be formed on one integrated circuit (IC) chip or on separate IC chips. Further, the various components of the LED driver may be implemented on a flexible printed circuit film, a tape carrier package (TCP), a printed circuit board (PCB), or formed on the same substrate. Further, the various components of the LED driver may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer-readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the exemplary embodiments of the present disclosure.

While this disclosure has been described in detail with particular references to illustrative embodiments thereof, the embodiments described herein are not intended to be exhaustive or to limit the scope of the disclosure to the exact forms disclosed. Persons skilled in the art and technology to which this disclosure pertains will appreciate that alterations and changes in the described structures and methods of assembly and operation can be practiced without meaningfully departing from the principles, spirit, and scope of this disclosure, as set forth in the following claims and equivalents thereof.

What is claimed is:

1. A light driver comprising:

a pulse generator circuit configured to generate a pulsed signal based on a rectified input line voltage;

a dimming detection circuit configured to determine whether phase-cut dimming is present at an input of the light driver based on the pulsed signal and to generate a phase-cut detection signal; and an input selection circuit configured to selectively apply a first voltage or a second voltage to a reference input of a power factor correction (PFC) circuit of the light driver based on the phase-cut detection signal.

2. The light driver of claim 1, further comprising:

a first voltage divider configured to generate an attenuated rectified voltage based on the rectified input line voltage, wherein the pulse generator circuit comprises:

a reference generator configured to generate a reference signal; and a first comparator configured to receive the reference signal and the attenuated rectified voltage, and to generate the pulsed signal based on a comparison of the reference signal and the attenuated rectified voltage.

3. The light driver of claim 2, wherein the reference generator comprises:

a zener diode coupled to a negative input of the first comparator, and wherein the reference signal is 2 V to 12 V.

4. The light driver of claim 2, wherein the first comparator comprises:

a first operational amplifier having a positive input terminal and a negative input terminal, and configured to receive the attenuated rectified voltage at the positive input terminal and the reference signal at the negative input terminal.

5. The light driver of claim 2, wherein the dimming detection circuit comprises:

a filter configured to low pass filter the pulsed signal and to produce a filtered signal; and a second comparator configured to receive the reference signal and the filtered signal and to produce the phase-cut detection signal, wherein a level of the phase-cut detection signal is indicative of a presence or absence of phase-cut dimming.

6. The light driver of claim 5, wherein the filter comprises a passive low pass RC filter, and wherein the filtered signal is a quasi-sawtooth signal.

7. The light driver of claim 5, wherein the second comparator comprises:

a second operational amplifier having a positive input terminal and a negative input terminal, and configured to receive the reference signal at the positive input terminal and the filtered signal at the negative input terminal.

8. The light driver of claim 1, wherein the pulsed signal is a pulse-width-modulated (PWM) signal having a duty cycle corresponding to a phase-cut of the rectified input line voltage.

9. The light driver of claim 1, wherein the pulse generator circuit is configured to transmit the pulsed signal to a channel controller of the light driver.

10. The light driver of claim 1, further comprising:

the PFC circuit configured to reduce a total harmonic distortion (THD) of the light driver and to increase a power factor (PF) of the light driver.

11. The light driver of claim 1, wherein an input of the light driver is coupled to a phase-cut dimmer configured to perform phase-cutting of an input line voltage based on a dimmer setting.

12. The light driver of claim 1, further comprising:

a rectifier configured to rectify an input line voltage to generate the rectified input line voltage; and a converter configured to convert the rectified input line voltage into a drive signal for powering a light source coupled to the light driver.

13. The light driver of claim 1, wherein an input line voltage from which the rectified input line voltage is generated is from 100 Vac to 277 Vac.

14. The light driver of claim 1, further comprising:

a second voltage divider configured to generate the first voltage based on the rectified input line voltage; and a third voltage divider configured to generate the second voltage based on a PFC input voltage, wherein the input selection circuit comprises:

a switching circuit coupled to the second and third, voltage dividers and configured to apply one of the first voltage and the second voltage to the reference input of the PFC circuit based on the phase-cut detection signal.

15. The light driver of claim 14, wherein the switching circuit comprises:

a first switch configured to activate in response to the phase-cut detection signal being at a first level to apply the first voltage to the reference input of the PFC circuit, and to deactivate in response to the phase-cut detection signal being at a second level to decouple the reference input of the PFC circuit from the second voltage divider; and a second switch configured to deactivate in response to the phase-cut detection signal being at the first level to decouple the reference input of the PFC circuit from the third voltage divider, and to activate in response to the phase-cut detection signal being at the second level to apply the second voltage to the reference input of the PFC circuit.

16. The light driver of claim 15, wherein the PFC circuit is configured to deactivate a current limit and a dimming control function of the PFC circuit in response to receiving the second voltage at the reference input.

17. The light driver of claim 15, wherein the first switch comprises a p-channel junction field effect transistor (JFET) and the second switch comprise an n-channel metal-oxide semiconductor field-effect transistor (MOSFET), each of the p-channel JFET and the n-channel MOSFET having a gate electrode coupled to an output of the input selection circuit.

18. The light driver of claim 15, wherein the first level is at a voltage lower than that of the second level, and wherein the phase-cut detection signal being at the first level indicates absence of phase-cut dimming at an input of the light driver, and the phase-cut detection signal being at the second level indicates a presence of phase-cut dimming at the input of the light driver.

19. A lighting system comprising:

a rectifier configured to receive a phase-cut input line voltage from a dimmer at an input of the rectifier and configured to generate a rectified input line voltage; and a light driver comprising:

a power factor correction (PFC) circuit having a reference input;

a pulse generator circuit configured to generate a pulsed signal based on the rectified input line voltage;

a dimming detection circuit configured to determine whether phase-cut dimming is present at an input of the light driver based on the pulsed signal and to generate a phase-cut detection signal; and an input selection circuit configured to selectively apply a first voltage or a second voltage to the reference input of the PFC circuit of the light driver based on the phase-cut detection signal.

20. The lighting system of claim 19, wherein the PFC circuit is configured to deactivate a current limit and a dimming control function of the PFC circuit in response to receiving the second voltage at the reference input.

* * * * *